(12) United States Patent
Kato et al.

(10) Patent No.: US 6,342,546 B1
(45) Date of Patent: Jan. 29, 2002

(54) CATIONIC ELECTRODEPOSITION COATING COMPOSITION

(75) Inventors: Kiyoshi Kato; Katsuhisa Sugisaki, both of Kanagawa-ken (JP)

(73) Assignee: Kansai Paint Co., Ltd., Hyogo-ken (JP)

( * ) Notice: Subject to any disclaimer, the term of this patent is extended or adjusted under 35 U.S.C. 154(b) by 0 days.

(21) Appl. No.: 09/552,515

(22) Filed: Apr. 19, 2000

(30) Foreign Application Priority Data

Apr. 21, 1999 (JP) ............................................. 11-112991
Apr. 14, 2000 (JP) ............................................. 12-113043

(51) Int. Cl.⁷ ................................................. C25D 13/10
(52) U.S. Cl. ....................... 523/415; 204/489; 204/499
(58) Field of Search ................................. 204/489, 499; 523/415

(56) References Cited

U.S. PATENT DOCUMENTS

| 3,984,299 | A | | 10/1976 | Jerabek |
| 4,017,438 | A | | 4/1977 | Jerabek et al. |
| 4,810,738 | A | * | 3/1989 | Caridi ..................... 204/181.6 |
| 6,130,274 | A | * | 10/2000 | Song et al. ................. 204/504 |

FOREIGN PATENT DOCUMENTS

| CA | 2010820 | | 8/1991 |
| EP | 0 265 655 | A1 | 5/1988 |
| EP | 0 303 182 | A2 | 2/1989 |
| JP | 59-43013 | | 3/1984 |

OTHER PUBLICATIONS

WPI Abstract Accession No. 1992–129349 No month available.

* cited by examiner

Primary Examiner—K. Mayekar
(74) Attorney, Agent, or Firm—Fisher, Christen & Sabol

(57) ABSTRACT

A cationic electrodeposition coating composition comprising (A) a cationic resin having a crosslinkable functional group and a cationic group in one molecule, (B) a crosslinking agent, and (C) polyether polyol, said cationic electrodeposition coating composition having a volatile organic solvent content in the range of 1% by weight or less.

3 Claims, No Drawings

CATIONIC ELECTRODEPOSITION COATING COMPOSITION

BACKGROUND OF THE INVENTION

(1) Field of the Invention

The present invention relates to a cationic electrodeposition coating composition having a low volatile organic solvent content that is, having a low content of a volatile organic compound (hereinafter may be referred to as VOC).

(2) Description of Background Art

The cationic electrodeposition coating composition has a high throwing power and is capable of forming a coating film showing good properties in durability, corrosion resistance and the like, and has widely been used as a primer coating composition coated on an electrically conductive metal such as an automobile body, electrical All articles and the like, in which the above coating film properties are required.

The electrodeposition coating composition in the prior art needs to contain 2% by weight or more of a volatile organic solvent such as monoalcohols, glycols, cellosolves, ketones and the like, so that a satisfactory film-forming properties may be maintained. On the other hand, demand on reducing a content of a volatile component in the electrodeposition coating composition, for example, an organic solvent from the standpoints of prevention of environmental disruption, saving of resources and the like has been increased.

In view of the above, it may be proposed to simply remove the volatile component in the electrodeposition coating composition so that a content of the volatile component may be 1% by weight or less, resulting in that reduction in film-forming properties makes it difficult to form a cured coating film having a film thickness of 15 μm or more, and reduces smoothness and corrosion resistance. On the other hand, in the application of the electrodeposition coating composition to a galvanized alloy, for example, an automobile body as widely used as a substrate, a high energized voltage for the purpose of thickening the electrodeposition coating film develops pinholes due to generation of gas, resulting in undesirably reducing smoothness of the coating film.

SUMMARY OF THE INVENTION

It is an object of the present invention to provide a cationic electrodeposition coating composition having a volatile organic solvent content in the range of 1% by weight or less without reducing throwing power, corrosion resistance, etc. and showing good film-forming properties, and is capable of forming a coating film showing good smoothness.

It is another object of the present invention to provide a cationic electrodeposition coating composition capable of applying to a galvanized alloy to form a thick coating film having a film thickness of 15 μm or more without developing pinholes due to generation of gas.

That is, the present invention provides a cationic electrodeposition coating composition comprising (A) a cationic resin having a crosslinkable functional group and a cationic group in one molecule, (B) a crosslinking agent, and (C) polyether polyol, said cationic electrodeposition coating composition having a volatile organic solvent content in the range of 1% by weight or less.

DETAILED DESCRIPTION OF THE INVENTION

The cationic electrodeposition coating composition of the present invention may include a water-based coating composition which essentially contains a cationic resin (A) having a crosslinkable functional group such as hydroxyl group and a cationic group in one molecule, a crosslinking agent (B) and polyether polyol (C), and optionally contains color pigments, anti-corrosive pigments, extender pigments, organic solvents, acids for use in neutralization, anti-cissing agents, surface active agents, catalysts, inhibitors, rheology-controling agents, pigment dispersants and the like.

The cationic resin (A) has a crosslinkable functional group such as hydroxyl group and a cationic group in one molecule, and may include, as a resin skelton, epoxy resin, acrylic resin, polybutadiene, alkyd resin, polyester resin and the like. Of these, a cationic resin prepared by addition of an amine to the epoxy resin is preferable from the standpoint of good corrosion resistance.

Examples of the cationic resin prepared by addition of the amine to the epoxy resin may include (1) adducts of an epoxy compound with primary mono or polyamine, secondary mono or polyamine, primary and secondary mixed polyamine or the like (see U.S. Pat. No. 3984299 Specification); (2) adducts of an epoxy compound with a ketiminized, primary amino group-containing mono or polyamine (see U.S. Pat. No. 4017438 Specification); (3) reaction products obtained by etherification between an epoxy compound and a ketiminized, primary amino group-containing hydroxyl compound (see Japanese Patent Application Laid-Open No. 43013/84), and the like. These may be modified with a modifier such as polyamide resin and the like.

The above epoxy compound has at least two epoxy groups in one molecule and a number average molecular weight in the range of 400 to 4000, and may be prepared by a reaction between a polyphenol compound and epichlorohydrin. Examples of the polyphenol compound may include bis(4-hydroxyphenyl)2,2-propane, 4,4-dihydroxybenzophenone, bis(4-hydroxyphenyl)-1,1-ethane, bis(4-hydroxyphenyl)-1,1-isobutane, bis(4-hydroxy-tert-butylphenyl)-2,2-propane, bis(2-hydroxynaphthyl)methane, 1,5-dihydroxynaphthalene, bis(2,4-dihydroxyphenyl) methane, tetra(4-hydroxyphenyl)-1,1,2,2-ethane, 4,4-dihydroxyphenylsulfone, phenol novolak, cresol novolak, and the like.

The crosslinking agent (B) may include known crosslinking agents such as blocked polyisocyanate compound, amino resin and the like. The blocked polyisocyanate compound may include a reaction product obtained by subjecting all of isocyanate groups to addition reaction of a blocking agent to the isocyanate groups. The polyisocyanate compound is a compound having at least two isocyanate groups in one molecule, and may include known aromatic, alicyclic and aliphatic polyisocyanate compounds, and isocyanate group-terminated prepolymers obtained by reacting a low molecular weight active hydrogen-containing compound such as glycol or triol with an excess amount of the above polyisocyante compounds. Examples of the blocking agent may include lactams, oximes, phenols, aliphatic alcohols, aromatic alkyl alcohols, ether alcohols, and the like.

A mixing ratio of the cationic resin (A) to the crosslinking agent (B) is such that the cationic resin (A) is in the range of 50 to 90% by weight, preferably 65 to 80% by weight, and the crosslinking agent (B) is in the range of 50 to 10% by weight, preferably 35 to 20% by weight based on a total weight of solid contents of both components (A) and (B) respectively.

The cationic resin (A) may be neutralized with a water-soluble organic acid such as formic acid, acetic acid, lactic acid and the like so as to be water-soluble or water-dispersible.

Examples of the anti-corrosive pigment may include zinc dust, zinc phosphate, calcium phosphate, aluminum phosphate, aluminum polyphosphate such as aluminum tripolyphosphate, aluminum orthophosphate, calcium orthophosphate, boric acid based anti-corrosive pigment, alkaline earth metal, zinc oxide and the like, compound oxides of iron oxides with at least one of the above compounds, tungstic acid based anti-corrosive pigments, phosphite based anti-corrosive pigments, hypophosphous acid based anti-corrosive pigments, nitrite based anti-corrosive pigments, vanadic acid based anti-corrosive pigments, zinc formate, zinc acetate, zinc octenate and the like, and further may include compounds represented by chemical formulas such as $Zr(OH)_4$, $Mg_4Al_2(OH)_{12}CO_3 \cdot 3H_2O$, $Mg_6Al_2(OH)_{16}CO_3 \cdot 5H_2O$ and $Mg_6Al_7(OH)_{16}CO_3 \cdot 4H_2O$; and bismuth-containing compounds such as bismuth lactate, bismuth silicate, triphenylbismuth, bismuth gallate, bismuth hydroxide, bismuth trioxide, bismuth nitrate, bismuth benzoate, bismuth citrate, bismuth oxycarbonate, and the like.

The above anti-corrosive pigments may usually be used as a powder having a particle size of 10 μm or less, particularly 0.01 to 3 μm, and may suitably be used in the range of 0.5 to 100 parts by weight, particularly 1 to 50 parts by weight per 100 parts by weight of a total resin solid content of the cationic resin (A) and crosslinking agent (B) used in the cationic electrodeposition coating composition.

Examples of the polyether polyol (C) may include alkylene based polyether polyol such as polyoxymethylene glycol, polyoxyethylene glycol, polypropylene glycol, polyoxybutylene glycol and the like; aromatic ring-containing polyether polyol such as bisphenol alone and combination of bisphenol with glycol; and the like. The above polyether polyol suitably has a number average molecular weight of 200 to 3000, preferably 600 to 1500, and a boiling point of 200° C. or tea higher. The above polyether polyol (C) does not include the volatile organic solvent.

The polyether polyol (C) may be contained in the range of 0.5 to 15 parts by weight, particularly 2 to 10 parts by weight per 100 parts by weight of a total resin solid content of the cationic resin (A) and the crosslinking agent (B).

The cationic electrodeposition coating composition of the present invention may be prepared, for example, by a process which comprises adding a cationic resin (A) having a crosslinkable functional group and a cationic group in one molecule and a crosslinking agent (B) into a volatile organic solvent, adding thereinto polyether polyol (C), followed by adding an acid to neutralize the cationic resin, dispersing into water to form an emulsion, uniformly mixing, and vacuuming and removing the volatile organic solvent contained in the emulsion.

The volatile organic solvent may preferably has a boiling point of about 130° C. or lower, preferably 120° C. or lower, so that all or almost all of the organic solvent contained in the emulsion may be removed during the vacuuming step. Examples of the organic solvent having the above boiling points may include methyl ethyl ketone, mehyl isobutyl ketone, isopropanol and the like. Use of the above volatile organic solvent makes it possible to easily control a volatile organic solvent content in the electrodeposition coating bath on electrodeposition coating in the range of 1% by weight or less. The vacuuming step may preferably be carried out under a vacuum of −700 mm Hg or lower.

The cationic electrodeposition coating composition prepared as above containing the component (C) has a volatile organic solvent content of 1% by weight or less, preferably 0.5% by weight or less and is coated under known electrodeposition coating conditions, resulting in showing good film-forming properties without reducing throwing power and corrosion resistance, and in making it possible to obtain a coating film showing good smoothness, particularly to coat so as to form a thick cured coating film of 15 μm or more, preferably 20 μm or more even if coated onto a galvanized alloy without developing pinholes due to generation of gas. That is, use of the above cationic electrodeposition coating composition makes it possible to reduce a volatile organic solvent content to 1% by weight or less without reducing corrosion resistance and smoothness, resulting in achieving an object of reducing the volatile organic compound (VOC).

The cationic electrodeposition coating composition of the present invention is diluted with deionized water or the like so as to be a solid content of about 5 to 40% by weight and controlled so as to form an electrodeposition coating bath having a pH of 5.5 to 9.0. A coating object as a cathode is dipped into the electrodeposition coating bath to be energized under the conditions of a bath temperature of 15 to 35° C. and a loading voltage of 100 to 400V to carry out the electrodeposition coating. Even if coated onto a galvanized alloy, a cured coating film having a thickness of 15 μm or more may easily be formed. After the completion of energizing, the coating object may be taken out of the electrodeposition coating bath, followed by washing with water, and heating at 100 to 200° C. for 10 to 40 minutes to cure the coating film.

The cationic electrodeposition coating composition containing the polyether polyol has a volatile organic solvent content of 1% by weight or less and is coated under known electrodeposition coating conditions, resulting in showing good film-forming properties without reducing throwing power and corrosion resistance, and in making it possible to obtain a coating film showing good smoothness, particularly to coat so as to form a thick cured coating film of 15 μm or more, preferably 20 μm or more even if coated onto a galvanized sheet metal without developing pinholes due to generation of gas. That is, the present invention makes it possible to provide the cationic electrodeposition coating composition having a volatile organic solvent content of 1% by weight or less without reducing corrosion resistance and smoothness, resulting in achieving an object of reducing the volatile organic compound (VOC).

EXAMPLE

The present invention will be explained more in detail by the following Examples and Comparative Examples, in which "part" and "%" mean "part by weight" and "% by weight" respectively. The present invention should not be limited thereto. A film thickness of the coating film means a cured film thickness.

Preparation Example 1

(Preparation of a varnish (1) for use in cationic electrodeposition coating composition)

One thousand nine hundred parts of Epon 1004 (Trade name, marketed by Oil Shell Epoxy Co., Ltd., bisphenol A type epoxy resin, epoxy equivalent: about 950) was dissolved into 1012 parts of methyl isobutyl ketone, followed by heating at 80 to 100° C., dropping 124 parts of diethylamine, and reacting at 110° C. for 2 hours to obtain an amine-added epoxy resin. On the other hand, 1000 parts of Versamid (Trade name, marketed by Henkel Hakusui Corporation, dimer acid type polyamide resin, amine value 100) was dissolved into 429 parts of methyl isobutyl ketone, followed by heating and refluxing at 130 to 150° C., distilling off a produced water and ketiminizing a terminal amino group of the amide resin, keeping at 150° C. for about 3 hours, after the completion of distilling off the water cooling down to 60° C., adding to the amine-added epoxy resin, heating at 100° C. and keeping for one hour, and cooling down to room temperature to obtain an amine-added, polyamide-modified epoxy resin varnish (1) having a solid content of 68% and an amine value of 65.

Example 1

A mixture of 103 parts (70 parts as the resin solid content) of the varnish (1) for use in a cationic electrodeposition coating composition, 30 parts of 2-ethylhexyl alcohol-blocked product of tolylene diisocyanate, 2 parts as the solid content of polyether polyol (a) (Note 1), and 15 parts of 10% aqueous acetic acid solution was uniformly mixed, followed by dropping 150 parts of deionized water strongly stirring over about 15 minutes to obtain an emulsion for use in a cationic electrodeposition coating and having a solid content of 34%, subjecting the emulsion to desolvation under vacuum at 30 to 40° C. so that a final cationic electrodeposition coating composition may have a volatile organic solvent content of 0.5% or less, adding the same amount of deionized water as a total amount of the organic solvent, water, etc., which were removed during desolvation, adding with agitation 71 parts of a pigmented paste (Note 2) to 300 parts of the resulting emulsion, and diluting with deionized water to obtain a cationic electrodeposition coating composition having a solid content of 20%.

(Note 1) Polyether polyol (a) represented by the formula:

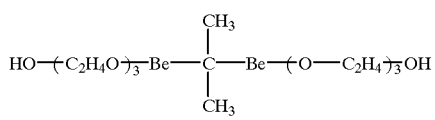

where "Be" means "Benzene".

(Note 2) Pigmented Paste:

A dispersion having a solid content of 43% and consisting of 5 parts of the varnish (1) for use in the cationic electrodeposition coating composition, 2.6 parts of 10% aqueous acetic acid solution, 17 parts of titanium oxide, 2 parts of bismuth hydroxide, 8 parts of purified clay, 0.3 part of carbon black and 36.5 parts of deionized water.

Example 2

A mixture of 103 parts (70 parts as the solid content) of the varnish (1) for use in the cationic electrodeposition coating composition, 30 parts of 2-ethylhexyl alcohol-blocked product of tolylene diisocyanate, 5 parts as the solid content of polyether polyol (a) (Note 1) and 15 parts of 10% aqueous acetic acid solution was uniformly mixed, dropping thereinto 156 parts of deionized water strongly stirring over about 15 minutes to obtain an emulsion for use in the cationic electrodeposition coating and having a solid content of 34%, subjecting the emulsion to desolvation under vacuum at 30 to 40° C. so that a final cationic electrodeposition coating composition may have a volatile organic solvent content of 0.5% or less, adding the same amount of deionized water as a total amount of the organic solvent, water, etc., which were removed during desolvation, adding with agitation 71 parts of a pigmented paste (Note 2) to 300 parts of the resulting emulsion, and diluting with deionized water to obtain a cationic electrodeposition coating composition having a solid content of 20%.

Example 3

A mixture of 103 parts (70 parts as the resin solid content) of the varnish (1) for use in a cationic electrodeposition coating composition, 30 parts of 2-ethylhexyl alcohol-blocked product of tolylene diisocyanate, 2 parts as the solid content of polyether polyol (b) (Note 3) and 15 parts of 10% aqueous acetic acid solution was uniformly mixed, followed by dropping 150 parts of deionized water strongly stirring over about 15 minutes to obtain an emulsion for use in a cationic electrodeposition coating composition and having a solid content of 34%, subjecting the emulsion to desolvation under vacuum at 30 to 40° C. so that a final electrodeposition coating composition may have a volatile organic solvent content of 1% by weight or less, adding the same amount of deionized water as a total amount of an organic solvent, water, etc., which were removed during desolvation, adding 71 parts of a pigmented paste (Note 2) with agitation to 300 parts of the resulting emulsion, and diluting with deionized water to obtain a cationic electrodeposition coating composition having a solid content of 20%.

(Note 3): Polyether polyol (b) represented by the following formula:

where "Be" means "benzene".

Example 4

A mixture of 103 parts (70 parts as the solid content) of the varnish (1) for use in a cationic electrodeposition coating composition, 30 parts of 2-ethylhexyl alcohol-blocked product of tolylene diisocyanate, 2 parts as the solid content of polyether polyol (c) (Note 4), and 15 parts of 10% aqueous acetic acid solution was uniformly mixed, followed by dropping 150 parts of deionized water strongly stirring over about 15 minutes to obtain an emulsion for use in a cationic electrodeposition coating composition and having a solid content of 34%, subjecting the emulsion to desolvation under vacuum at 30 to 40° C. so that a final electrodeposition coating composition may have a volatile organic solvent content of 1% or less, adding the same amount of deionized water as a total amount of an organic solvent, water, etc., which were removed during desolvation, adding with agitation 71 parts of the pigmented paste (Note 2) to 300 parts of the resulting emulsion, and diluting with deionized water to obtain a cationic electrodeposition coating composition having a solid content of 20%.

(Note 4): Polyether polyol (c) represented by the following formula:

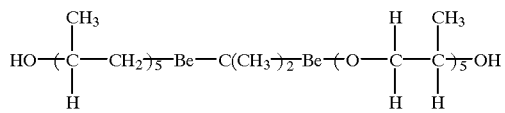

where "Be" means "benzene".

Comparative Example 1

A mixture of 103 parts (70 parts as the resin solid content) of the varnish (1) for use in a cationic electrodeposition coating composition, 30 parts of 2-ethylhexyl alcohol-blocked product of tolylene diisocyanate, and 15 parts of 10% aqueous acetic acid solution was uniformly mixed, followed by dropping 146 parts of deionized water strongly stirring over about 15 minutes to obtain an emulsion for use in a cationic electrodeposition coating composition and having a solid content of 34%, subjecting the emulsion to desolvation under vacuum at 30 to 40° C. so that a final electrodeposition coating composition may have a volatile organic solvent content of about 2%, adding the same amount of deionized water as a total amount of an organic solvent, water, etc., which were removed during desolvation, adding 71 parts of a pigmented paste (Note 2) with agitation to 294 parts of the resulting emulsion, and diluting with deionized water to obtain a cationic electrodeposition coating composition having a solid content of 20%.

Comparative Example 2

A mixture of 103 parts (70 parts as the resin solid content) of the varnish (1) for use in a cationic electrodeposition coating composition, 30 parts of 2-ethylhexyl alcohol-blocked product of tolylene diisocyanate, and 15 parts of 10% aqueous acetic acid solution was uniformly mixed, followed by dropping 146 parts of deionized water strongly stirring over about 15 minutes to obtain an emulsion for use in a cationic electrodeposition coating composition and having a solid content of 34%, subjecting the emulsion to desolvation under vacuum at 30 to 40° C. so that a final electrodeposition coating composition may have a volatile organic solvent content of 0.5% or less, adding the same amount of deionized water as a total amount of an organic solvent, water, etc., which were removed during desolvation, adding 71 parts of a pigmented paste (Note 2) with agitation to 300 parts of the resulting emulsion, and diluting with deionized water to obtain a cationic electrodeposition coating composition having a solid content of 20%.

Performance Test Result

Cationic electrodeposition coating compositions obtained in the above Examples and Comparative Examples were subjected to tests of a volatile organic solvent content in a final electrodeposition coating composition, throwing power, corrosion resistance, film-forming properties, pinhole-developing properties due to gas generation, and smoothness. Test results are shown in Table 1.

TABLE 1

|  | Examples | | | | Comparative Examples | |
| --- | --- | --- | --- | --- | --- | --- |
|  | 1 | 2 | 3 | 4 | 1 | 2 |
| Volatile organic solvent content (%) | 0.5 | 0.5 | 1.0 | 1.0 | 2.2 | 0.5 |
| Throwing power | 3 | 3 | 3 | 3 | 3 | 3 |
| Corrosion resistance | 3 | 3 | 3 | 3 | 3 | 3 |
| Film-forming properties | 3 | 3 | 3 | 3 | 3 | 1 |
| Pinhole-developing Properties due to gas Generation | 3 | 3 | 3 | 3 | 3 | 1 |
| Smoothness | 3 | 3 | 3 | 3 | 3 | 1 |

Test Method

Volatile Organic Solvent Content (%):

A volatile organic solvent content (%) in respective cationic electrodeposition coating compositions having a solid content of 20% was measured by use of gas chromatography.

Throwing Power:

Three of four 70×150×0.8 mm steel sheet have an opening having a diameter of 8 mm at the central portion, and the remaining steel sheet has no opening. The four sheets were successively placed at an interval of 20 mm to each other so that all sheets may face to an anode, that the sheet having no opening may be placed at the most distant place from the anode and that the sheet nearest to the anode may be at a distance of 110 mm from the anode. A surface facing to the anode of the sheet nearest to the anode and having the opening may be referred to as a surface (A), and a surface facing to the anode of the sheet at the most distant position from the anode and having no opening may be referred to as a surface (G). An electrodeposition coating film thickness as a cured film on the surface (G) was measured. The thicker the film thickness, the better the throwing power. An electrodeposition coating was carried out under the conditions of a bath temperature of 28° C., a voltage of 250 V, and an energized time of 180 seconds. Evaluation was made as follows.

3: Film thickness on the surface (G) is 10 $\mu$m or more; 2: film thickness on the surface (G) is 5 $\mu$m or more but less than 10 $\mu$m; 1: film thickness on the surface (G) is less than 5 $\mu$m.

Corrosion Resistance:

A degreased steel sheet was subjected to electrodeposition coating so as to be a film thickness of 20 $\mu$m, followed by heat curing at 180° C. for 30 minutes, cross-cutting the cured film so as to reach the base material, and subjecting the resulting cured film-coated steel sheet to a salt spray test for 480 hours. Appearance of the resulting film was examined and evaluated as follows.

3: No separation developed; 2: slight separation from the cut portion developed; 1: considerable separation from the cut portion developed.

Film-forming Properties:

An electrodeposition coating was carried out under the conditions of a bath temperature of 28° C., a loading voltage of 250 V, and an energized time of 180 seconds, followed by forming a cured coating film, and measuring a thickness ($\mu$m) of the cured coating film. Evaluation was made as follows.

3: 20 $\mu$m or more; 2: 15 $\mu$m or more but less than 20 $\mu$m; 1: less than 15 $\mu$m.

Pinhole-developing Properties Due to Gas Generation:

A galvanized alloy was coated under the electrodeposition coating conditions of a bath temperature of 28° C. and a loading voltage of 250 V, followed by measuring an amount of pinholes developed per 100 $cm^2$ of the resulting coating film was measured. Evaluation was made as follows.

3: No pinholes developed; 2: pinholes developed in an amount of 5 to 10; 1: pinholes developed in an amount of more than 10.

Smoothness:

Smoothness was visually evaluated as follows.

3: Good; 2: slightly poor; 1: seriously poor.

What is claimed is:

1. A cationic electrodeposition coating composition comprising (A) a cationic resin having a crosslinkable functional group and a cationic group in one molecule, (B) a crosslinking agent, and (C) polyether polyol, said polyether polyol (C) being an aromatic ring-containing polyether polyol consisting of an addition product of bisphenol with glycol, and having a number average molecular weight in the range of 200 to 3000 and a boiling point in the range of 200° C. or higher, said cationic electrodeposition coating composition having a volatile organic solvent content in the range of 1 percent by weight or less.

2. The composition as claimed in claim 1, wherein a mixing ratio of the cationic resin (A) to the crosslinking agent (B) is such that the former is in the range of 50 to 90 percent by weight and the latter is in the range of 50 to 10 percent by weight based on a total solid content of both components (A) and (B).

3. The composition as claimed in claim 1, wherein said polyether polyol (C) is contained in the range of 0.5 to 15 parts by weight per 100 parts by weight of a total resin solid content of the cationic resin (A) and the crosslinking agent (B).

* * * * *

Disclaimer

6,342,546 B1 — Kiyoshi Kato; Katsuhisa Sugisaki, both of Kanagawa-ken (JP). CATIONIC ELECTRODEPOSITION COATING COMPOSITION. Patent dated Jan. 29, 2002. Disclaimer filed on March 13, 2013, by the Assignee, Kansai Paint Co.

Hereby enters this disclaimer to claims 1 to 3 of said patent.

*(Official Gazette, June 25, 2013)*